US012679054B2

(12) United States Patent
Uribe Plaza et al.

(10) Patent No.: US 12,679,054 B2
(45) Date of Patent: Jul. 14, 2026

(54) METHOD FOR REPAIRING PLASTIC DIVIDERS AND PLASTIC DIVIDER OBTAINED BY SAID METHOD

(71) Applicants:CARTONPLAST IBERICA SLU, Parla (ES); PLASTIC REPAIR SYSTEM 2011 SL, Tajonar (ES)

(72) Inventors: Jose Ignacio Uribe Plaza, Tajonar (ES); Jose Maria Carrasco Turrero, Parla (ES); Nestor Gonzalez Benito, Parla (ES)

(73) Assignees: CARTONPLAST IBERICA SLU, Parla (ES); PLASTIC REPAIR SYSTEM 2011 SL, Tajonar (ES)

( * ) Notice: Subject to any disclaimer, the term of this patent is extended or adjusted under 35 U.S.C. 154(b) by 202 days.

(21) Appl. No.: 18/261,750

(22) PCT Filed: Dec. 1, 2021

(86) PCT No.: PCT/ES2021/070866
§ 371 (c)(1),
(2) Date: Jul. 17, 2023

(87) PCT Pub. No.: WO2022/157398
PCT Pub. Date: Jul. 28, 2022

(65) Prior Publication Data
US 2024/0066815 A1 Feb. 29, 2024

(30) Foreign Application Priority Data
Jan. 21, 2021 (ES) ................................ ES202130036

(51) Int. Cl.
B29C 73/04 (2006.01)
B29C 37/04 (2006.01)
B29C 65/18 (2006.01)

(52) U.S. Cl.
CPC .............. B29C 73/04 (2013.01); B29C 37/04 (2013.01); B29C 65/18 (2013.01)

(58) Field of Classification Search
CPC ....... B29C 65/18; B29C 37/04; B29C 38/105; B29C 2793/0054; B32B 38/04; Y10T 156/1028
See application file for complete search history.

(56) References Cited

U.S. PATENT DOCUMENTS 5,958,166 A * 9/1999 Walters ................... B29C 73/32
29/402.09
6,077,465 A * 6/2000 Fenske .................... B29C 73/02
156/98

(Continued)

FOREIGN PATENT DOCUMENTS

FR 2414392 A1 8/1979

OTHER PUBLICATIONS

International Search Report mailed Jan. 25, 2022 for the corresponding International Patent Application No. PCT/ES2021/070866, with English translation, 5 pages.

*Primary Examiner* — Alison L Hindenlang
*Assistant Examiner* — Debjani Roy
(74) *Attorney, Agent, or Firm* — LUCAS & MERCANTI, LLP

(57) ABSTRACT

Method for repairing plastic dividers (1), having longitudinal internal cavities (100), by following the steps of: —identifying and extracting the damaged areas to be repaired (2), some gaps (4) being defined, —preparing inserts (5) with a shape matching the gaps (4), and —attaching by heat welds (8) the inserts (5) in the gaps (4); —wherein the damaged areas to be repaired are extracted by cuts (3) with a curved path, and —wherein in the step of preparing the inserts (5), the inserts are machined with an outer edge (50) aligned with the edges (10) of the divider (1), and an inner edge (51)

(Continued)

parallel to the curved path of the cut (3), there being defined between the cut (3) made in the divider (1) and the inner edge (51) of the insert (5) a filling space (7) for filling with filler material (8).

8 Claims, 2 Drawing Sheets

(56)                    References Cited

U.S. PATENT DOCUMENTS

2014/0141190 A1 *    5/2014   Shigetomi ................. B64F 5/40
                                                    428/63
2015/0033559 A1 *    2/2015   Bruck ..................... B23P 6/007
                                                    29/889.1

* cited by examiner

METHOD FOR REPAIRING PLASTIC DIVIDERS AND PLASTIC DIVIDER OBTAINED BY SAID METHOD

CROSS-REFERENCE TO RELATED APPLICATIONS

This application is a 371 of PCT/ES2021/070866, filed Dec. 1, 2021, which claims the benefit of Spanish Patent Application No. P202130036, filed Jan. 21, 2021, each of which are incorporated herein by reference.

OBJECT OF THE INVENTION

The present invention relates to a method for repairing plastic dividers, of the type that can be used for separating levels in layers of packages in the distribution of products, and to the divider or dividers obtained by said method.

BACKGROUND OF THE INVENTION

Currently, the usual way for the industrial supply of multiple packages (for example, packages of beverages, even made of glass) is in pallets with layers comprising several levels separated by laminar dividers, normally of plastic, and fixed by a shrink wrapping giving body to the layer.

Dividers are frequently reusable—for the plastic ones specifically there is a circuit for washing and reusing them—since they are elements that are very robust and resistant to the stresses during their operation. Furthermore, plastic dividers can be recycled in the event of breakage. Currently, this is precisely what is done, removing the damaged dividers and recycling them. Nevertheless, the yearly amount of dividers which are recycled is about 650,000 units, which is a considerable volume and generates an equally considerable energy expenditure.

Since this volume is very high, the applicant thought of the possibility of repairing some of these dividers with minor breakages. With the usual heat welding methods used to attach solid plastic sheets (where the portions to be heat welded are butt-jointed and heat welded under determined temperature and pressure conditions) good results were not achieved, since these plastic dividers are not solid, but hollow (they have longitudinal cavities), there being plastic material of very little thickness available for attaching, and therefore the attachments obtained did not achieve sufficient strength, thus being a prejudice when attempting the repair by means of heat welds.

This drawback is solved with the method of the invention, according to which the repaired divider of the invention is obtained.

DESCRIPTION OF THE INVENTION

The method for repairing plastic dividers of the invention is applied to dividers of the type comprising longitudinal cavities, and according to the invention it comprises the following steps:

identifying the damaged areas to be repaired in the divider, extracting the damaged areas to be repaired previously identified by means of cuts, some gaps being defined, preparing inserts of undamaged material and with a shape matching said gaps, and attaching, by means of heat welds with filler material, the inserts of undamaged material in the gaps, wherein for the step of extracting the damaged areas to be repaired, cuts with a curved path (i.e., without angles) are used, and wherein for the step of preparing the inserts, inserts are machined which comprise a straight or angular outer edge, aligned with the edges of the divider, and a curvilinear inner edge parallel to the curved path of the cut for extracting the damaged area to be repaired, there being defined between the cut made in the divider and the inner edge of the insert a space for filling with filler material.

It is thus achieved that the filler material penetrates inside the cavities without breaking them up, —just with the own heat of said filler material—, and therefore that a large amount of surface is attached by this filler material, whereby a high mechanical strength is obtained, even greater than the original one.

Furthermore, as a result of the smooth change of direction of the cut and of the heat weld, many relative directions with respect to the direction of the cavities are encompassed, which also has an impact on the strength of the attachment and on preventing deformations of the plane of the insert with respect to the plane of the divider. Additionally, upon avoiding angular changes of direction, accumulations of the filler material are prevented, whereby the end result and the machining of the attachment are improved.

All this in addition to the advantage initially sought, which is reducing the environmental impact of recycling dividers, which can be quantified through its carbon footprint.

Indeed, the current use of these dividers—without repairing—has a mean life of 7 years, with 3 cycles or uses per year therefore 21 total uses. With the repair proposed in the present invention, an increase of service life of 3 more years is estimated, which means a total of 30 uses per year (9 more total uses).

The following table shows the amount (in Kg) of $CO_2$ generated for 30 cycles of use (production, cleaning and use) of the repaired divider and of an unrepaired divider (which in production would correspond to 2 dividers since its mean life is of 21 uses), wherein it can be seen that the $CO_2$ emitted in the case of the repaired divider is 63.6% of that of the divider without repairs. Therefore, the environmental advantage is undoubtable.

Mean Life Repaired Spacer 30 Uses (3 More Years)

Global Warming Potential
$CO_2$
Emitted

| 30 CYCLES | PRODUCTION (Kg $CO_2$) | Cleaning (kg $CO_2$) | Use (kg $CO_2$) | Total (kg $CO_2$) | |
|---|---|---|---|---|---|
| PP (REPAIRED) | 3.36 | 0.06 | 2.46 | 5.87 | |
| PP | 6.72 | 0.06 | 2.46 | 9.23 | −36.39% |

3

This is in addition to the reduction of the environmental impact of dividers of this type compared to those of cardboard, which, for example, is quite considerable in water consumption and $SO_2$ emissions.

DESCRIPTION OF THE PREFERRED EMBODIMENT

Figure 1:
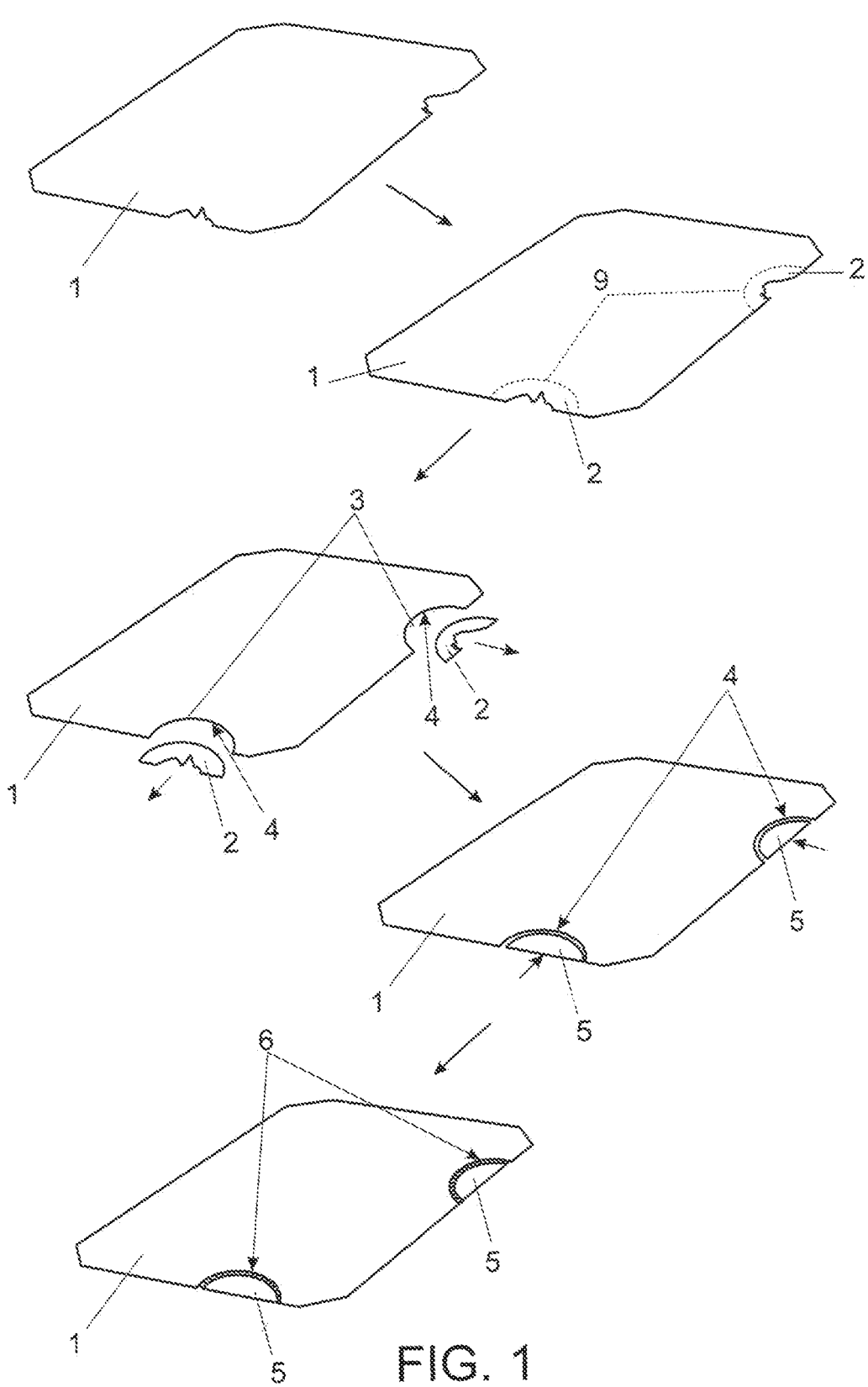
FIG. 1 schematically shows the method of the invention.

The method for repairing plastic dividers (1) of the invention is applied to dividers (1) of the type comprising longitudinal internal cavities (100) (see FIGS. 2 to 4), and it comprises the following steps (see FIG. 1):

identifying the damaged areas to be repaired (2) in the divider (1), extracting the damaged areas to be repaired (2) previously identified by means of cuts (3), some gaps (4) being defined, preparing inserts (5) of undamaged material and with a shape matching said gaps (4), and attaching, by means of heat welds (6) with filler material (8), the inserts (5) of undamaged material in the gaps (4);

wherein for the step of extracting the damaged areas to be repaired, cuts (3) with a curved path are used, and wherein for the step of preparing the inserts (5), inserts are machined (see FIGS. 2 and 3) which comprise a straight or angular outer edge (50), aligned with the edges (10) of the divider (1), and a curvilinear inner edge (51) parallel to the curved path of the cut (3) for extracting the damaged area to be repaired (2), there being defined between the cut (3) made in the divider (1) and the inner edge (51) of the insert (5) a filling space (7) for filling with the filler material (8).

The amplitude of the filling space (7) is preferred to be between 5.5 and 6.5 millimeters, which is where the best strength and non-deformability results have been found, with an optimal amplitude of 6 millimeters.

Furthermore, for the step of preparing the inserts (5), the machining thereof is performed such that the direction of the cavities (100) coincides in the insert (5) and in the divider (1) (see FIGS. 2 and 3), which on one hand homogenizes the penetration of the material and on the other hand improves the aesthetics.

Ideally, the step of attaching by means of heat welds (6) the inserts (5) of undamaged material in the gaps (4) comprises the following substeps:

preheating the divider (1) and the insert (5) (in the air) at a temperature comprised between 100 and 150 degrees, adding the filler material (8) in the filling space (7) at a temperature comprised between 220 and 250 degrees, and performing a smoothing of the heat weld (6). The preheating facilitates the flow and the penetration of the filler material without deforming or destroying the cavities (100), whereas the heating in this temperature range of the filler material is sufficient to achieve the penetration and the adhesion which provides the strength to the repair. It is preferred that the substep of preheating the divider (1) and the insert (5) is performed at 115 degrees, and that the substep of adding the filler material (8) in the filling space (7) is performed at 235 degrees, which have been the conditions where the best results have been obtained.

In relation to the substep of performing the smoothing of the heat weld, it can be performed by means of a pressing of the heat weld (6) (by means of pressing plates), and subsequent milling of burrs, with the advantage of a better finish and that a better penetration of the filler material and a better strength of the plate are achieved.

Figure 2:
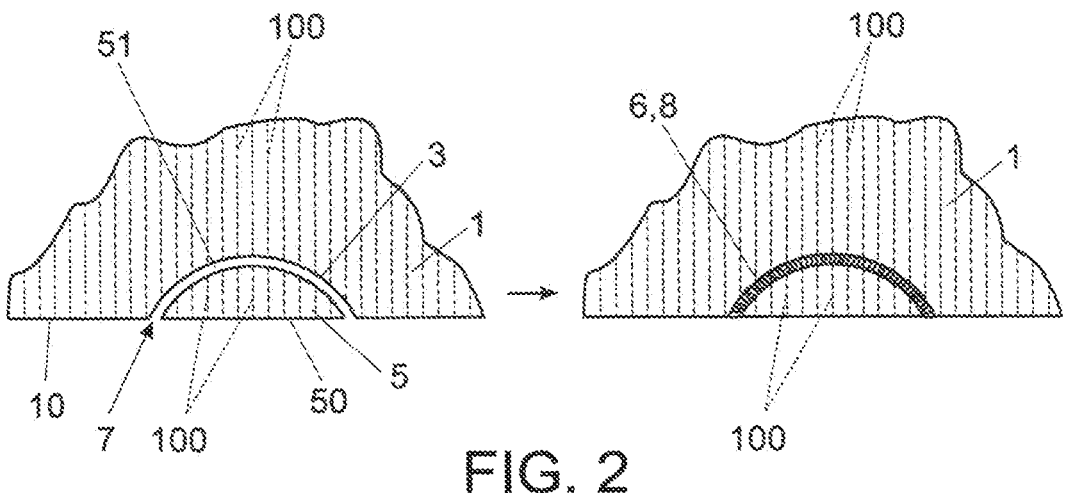
FIG. 2 shows a plan detail of the straight repair with an insert in a circular segment shape.
Figure 3:
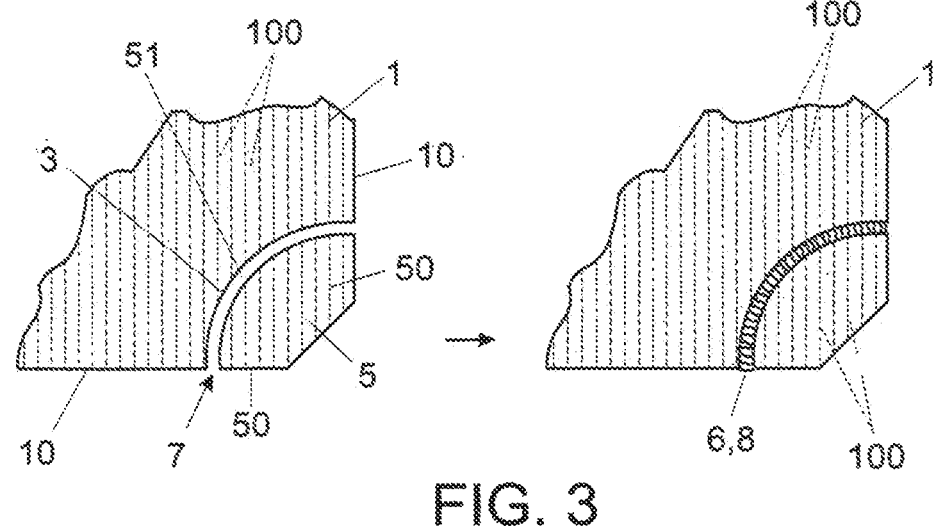
FIG. 3 shows a plan detail of the corner repair with an insert in a half circular segment shape.
Figure 4:
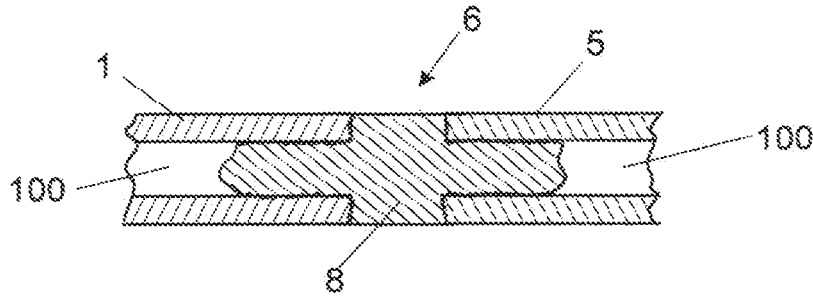
FIG. 4 shows a section detail of the heat weld, wherein it is appreciated how the filler material penetrates inside the cavities.

With respect to the step of identifying the damaged areas to be repaired (2), it has been preferred to carry it out by comparing them with a repairing template (9) (see FIG. 1), varying the position of said template (9) on the damaged areas until determining a repairing pattern of the damaged areas to be repaired (2), wherein all the damaged areas are encompassed with the minimum number of positions of the repairing template (9). Said repairing template (9) ideally has a circular segment shape (for inserts in straight edges) or a half circular segment shape (for inserts in corners), as can be seen in FIGS. 2 and 3, since it has the straight or angular outer edge and the curved inner edge in the simplest way possible. Preferably, for dividers of 1.2 m×1 m, it is preferred that the circular segment has a radius comprised between 120 and 220 millimeters, chord comprised between 245 and 345 millimeters and height comprised between 60 and 150 millimeters, with preferred values—where the best results have been found—of 150 millimeters of radius, 275 millimeters of chord and 90 millimeters of height. For the half circular segment, radius comprised between 120 and 220 millimeters (preferred value 150 millimeters), chord comprised between 130 and 175 millimeters (preferred value 137.5 millimeters), and height comprised between 60 and 150 millimeters (preferred value 90 millimeters). This has been thus selected because it has empirically been seen in the tests that it is the best arrangement. Furthermore, before the step of extracting the damaged areas to be repaired (2), a step of accepting the repair can be performed if the number of positions of the repairing template (9) in the repairing pattern is comprised, for example, between one and five, or of rejecting the repair of the divider if the number of positions of the repairing template (9) is greater than five. It is expected that, due to the repairing and environmental impact costs in comparison with the use of new dividers, the optimal maximum number of repairs is two, normally rejecting the repair if the repairs to be performed can only be covered with three or more positions of the template (9).

Finally, with the method of the invention a plastic divider (1) is obtained of the type comprising longitudinal internal cavities (100), which divider comprises at least one repairing insert (5), which is attached by heat welding (6) in at least one gap (4) made by means of a curved cut (3) encompassing at least one previous damaged area to be repaired (2); wherein the insert comprises an straight or angular outer edge (50) aligned with the edge (10) of the divider (1), and a curvilinear inner edge (51) parallel to the curved path of the cut (3), comprising a filling space (7) between the cut (3) made in the divider (1) and the inner edge (51) of the insert (5) which is filled with filler material (8). It is preferred for this divider that the direction of the cavities (100) thereof and of its inserts (5) coincides.

Nevertheless, and since the description made corresponds only to a preferred embodiment of the invention, it will be understood that, within its essence, multiple detail variations may be introduced, which are likewise protected, which may affect the shape, the size or the manufacturing materials, of the whole or of its parts, without this entailing any alteration of the invention as a whole, delimited only by the claims which are provided below.

The invention claimed is:

1. A method for repairing plastic dividers comprising longitudinal internal cavities, comprising the following steps:

identifying a damaged area to be repaired in a plastic divider, extracting the damaged area to be repaired previously identified by means of one or more cuts, wherein a gap is defined in the plastic divider, wherein a first edge of the gap in the plastic divider comprises a first pair of plastic layers separated by a first longitudinal internal cavity, preparing an insert of undamaged material and with a shape matching said gap, wherein a second edge of the insert comprises a second pair of plastic layers separated by a second longitudinal internal cavity, and attaching, by means of one or more heat welds with filler material, the insert of undamaged material in the gap, wherein a first portion of the filler material penetrates into the first longitudinal internal cavity between the first pair of plastic layers and a second portion of the filler material penetrates into the second longitudinal internal cavity between the second pair of plastic layers;

wherein for the step of extracting the damaged area to be repaired, a cut with a curved path is used, and wherein in the step of preparing the insert, the insert is machined to include a straight or angular outer edge, aligned with the edges of the plastic divider, and the second edge, the second edge comprising a curvilinear inner edge parallel to the curved path of the cut for extracting the damaged area to be repaired, there being defined between the cut made in the divider and the inner edge of the insert a filling space for filling with the filler material.

2. The method for repairing plastic dividers according to claim 1, wherein the amplitude of the filling space is between 5.5 and 6.5 millimeters.

3. The method for repairing plastic dividers according to claim 2, wherein the amplitude of the filling space is 6 millimeters.

4. The method for repairing plastic dividers according to claim 1, wherein in the step of preparing the insert, the machining thereof is performed such that the direction of the cavities coincides in the insert and in the plastic divider.

5. The method for repairing plastic dividers according to claim 1, wherein the step of attaching by means of heat welds the inserts of undamaged material in the gaps comprises the following substeps:

preheating the plastic divider and the insert at a temperature comprised between 100 and 150 degrees, adding the filler material in the filling space at a temperature comprised between 220 and 250 degrees, and performing a smoothing of the heat weld.

6. The method for repairing plastic dividers according to claim 5, wherein the substep of preheating the plastic divider and the insert is performed at 115 degrees.

7. The method for repairing plastic dividers according to claim 5, wherein the substep of adding the filler material in the filling space is performed at 235 degrees.

8. The method for repairing plastic dividers according to claim 5, wherein the substep of performing the smoothing of the heat weld is performed by means of pressing the heat weld and subsequently milling the burrs.

* * * * *